(12) United States Patent
Woo

(10) Patent No.: US 7,145,560 B2
(45) Date of Patent: Dec. 5, 2006

(54) CONTROLLING POWER OF LIQUID CRYSTAL DISPLAY DEVICE

(75) Inventor: Jong Hyun Woo, Pyungtack-si (KR)

(73) Assignee: LG Electronics Inc., Seoul (KR)

( * ) Notice: Subject to any disclaimer, the term of this patent is extended or adjusted under 35 U.S.C. 154(b) by 298 days.

(21) Appl. No.: 10/340,844

(22) Filed: Jan. 13, 2003

(65) Prior Publication Data
US 2003/0132929 A1 Jul. 17, 2003

(30) Foreign Application Priority Data
Jan. 14, 2002 (KR) .............. 10-2002-0002103

(51) Int. Cl.
*G09G 5/00* (2006.01)
(52) U.S. Cl. .............. 345/211; 345/204; 345/210; 345/212
(58) Field of Classification Search .......... 345/87–104, 345/204–215; 315/104–109, 158
See application file for complete search history.

(56) References Cited

U.S. PATENT DOCUMENTS

| | | | |
|---|---|---|---|
| 5,272,327 A | 12/1993 | Mitchell et al. | |
| 5,623,277 A * | 4/1997 | Lippmann et al. | 345/87 |
| 5,786,801 A | 7/1998 | Ichise | |
| 5,907,222 A * | 5/1999 | Lengyel et al. | 315/158 |
| 5,996,082 A | 11/1999 | Cortopassi | |
| 6,252,355 B1 | 6/2001 | Meldrum et al. | |
| 6,348,910 B1 * | 2/2002 | Yamamoto et al. | 345/102 |
| 6,404,145 B1 | 6/2002 | Saito | |
| 2002/0080132 A1 * | 6/2002 | Dai et al. | 345/212 |

FOREIGN PATENT DOCUMENTS

| | | |
|---|---|---|
| JP | 10203715 | 7/1998 |
| JP | 2000-035564 A | 2/2000 |

* cited by examiner

*Primary Examiner*—Vijay Shankar
(74) *Attorney, Agent, or Firm*—Fleshner & Kim, LLP

(57) ABSTRACT

An apparatus is provided that includes circuitry (i.e. a central processing unit), a peripheral device (i.e. a liquid crystal display), and a thermal coupler. The peripheral device is substantially thermally insulated from the circuitry. The thermal coupler thermally couples the circuitry and the peripheral device. A method is also provided that includes a sensing step and a causing step. The sensing step includes sensing a temperature of a peripheral device (i.e. a liquid crystal display). The causing step includes causing power to be provided to the peripheral device according to the sensed temperature.

13 Claims, 3 Drawing Sheets

CONTROLLING POWER OF LIQUID CRYSTAL DISPLAY DEVICE

This application is related to U.S. patent application Ser. No. 09/972,876 filed Oct. 10, 2001 and U.S. patent application Ser. No. 10/194,068 filed Jul. 15, 2002. The entire disclosure of the prior applications are considered as being part of the disclosure of the accompanying application and is hereby incorporated by reference therein.

BACKGROUND OF THE INVENTION

1. Field of the Invention

The present invention relates to liquid crystal display (LCD) devices.

2. Background of the Related Art

Liquid Crystal Displays (LCD) are devices for displaying video content. An example of one use of a LCD is a viewing screen of a video camera. LCDs are relatively light weight and therefore may be well suited for portable electronic devices (i.e. a video camera). Problems do exist in the implementation of LCDs.

Liquid Crystal Displays (LCD) do consume electric power during operation. Many portable electronic devices that do employ LCDs run on batteries. Batteries have a finite capacity to store power, which limits the length of time that some portable electronic devices can operate. There has been a long felt need to increase the length of time that a portable electronic device can operate from battery power. Accordingly, there has been a long felt need to minimize power consumption of a LCD, without degrading quality (i.e. the consistency of the brightness of the LCD) to increase the length of time that a portable electronic device can operate.

The brightness of a Liquid Crystal Display (LCD) is the amount of light output from the LCD. Changes in brightness are considered by many users of LCDs as an indication of a low quality product. Accordingly, there has been a long felt need for a LCD that has consistent brightness.

SUMMARY OF THE INVENTION

Objects of the present invention at least include overcoming the disadvantages of the related art. Embodiments of the present invention relate to an apparatus comprising circuitry (i.e. a central processing unit), a peripheral device (i.e. a liquid crystal display), and a thermal coupler. The peripheral device is substantially thermally insulated from the circuitry. The thermal coupler thermally couples the circuitry and the peripheral device. For example, in some embodiments, a liquid crystal display will operate more efficiently at higher temperatures. Further, circuitry often outputs heat during operation. Often, circuitry is physically separated from the LCD and the efficiency of the LCD does not benefit from the outputted heat, absent the thermal coupler.

Embodiments of the present invention relate to a method comprising a sensing step and a causing step. The sensing step includes sensing a temperature of a peripheral device (i.e. a liquid crystal display). The causing step includes causing power to be provided to the peripheral device according to the sensed temperature. For example, some embodiments stabilize the brightness of a Liquid Crystal Display (LCD) by controlling the power supplied to the LCD according to the sensed temperature. For instance, if the temperature of the LCD increases (which may cause the brightness of the LCD to increase), the amount of power to the LCD is decreased to maintain a consistent brightness. This process takes advantage of the relationship of brightness of a LCD to the power supplied to the LCD.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

DETAILED DESCRIPTION OF PREFERRED EMBODIMENTS

Figure 1:
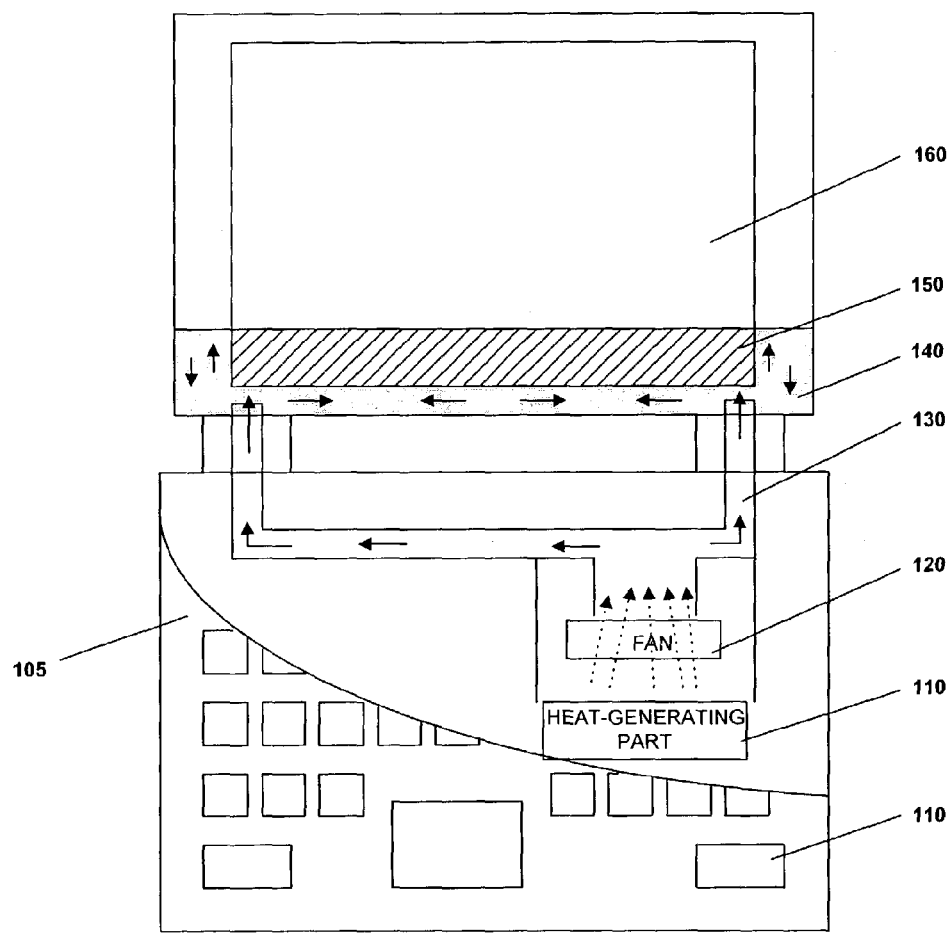
FIG. 1 is an exemplary schematic view illustrating a configuration adapted to utilize heat internally generated from a system in a LCD device power control apparatus.

Systems using LCDs as display devices may be equipped with a back light lamp and a front light lamp as light sources for accurately and clearly displaying information. For such a back light lamp (hereinafter, simply referred to as a "LCD lamp"), a cold cathode fluorescent lamp (CCFL) may be used. In order to drive this lamp, it may be necessary to supply an appropriate amount of power. For example, in portable systems equipped with a LCD smaller than 14.1 inches, it may be necessary to supply an AC voltage of 200 to 700 V (40 to 150 KHz), and a current of 0.5 to 7 mA for driving a LCD lamp. In order to supply a desired voltage and a desired current to the LCD lamp, an inverter may be used. A LCD lamp may be driven by a voltage and current supplied from the inverter. Brightness of a LCD lamp may be proportional to the magnitude of current flowing through the LCD lamp.

In some notebook computers, brightness of a LCD lamp may be adjustable by manipulating an input device (i.e. a keyboard). Information about variation in brightness inputted by an input device may be output to a microprocessor. Brightness variation information output to a microprocessor may be converted into digital brightness adjustment information. For example, digital brightness adjustment information may be a voltage level or a variable duty width of a PWM signal, required for the brightness adjustment of a LCD lamp. Brightness adjustment information may be applied to an inverter. In accordance with brightness adjustment information, an inverter may apply to a LCD lamp a voltage and current corresponding to applied brightness adjustment information to adjust brightness of a LCD lamp.

One important feature of some LCD lamps (i.e. a CCFL) is that brightness of a lamp may vary in accordance with temperature of the lamp. For example, a LCD lamp may exhibit an increase in brightness proportional to the lamp's temperature. Systems using LCDs may be configured to supply, to a LCD lamp, a voltage and current determined to meet the characteristics of the LCD lamp at room temperature (i.e. 25° C.). In these systems, the brightness of the LCD lamp is adjustable only according to a user's manual input.

Some devices include LCDs that are thermally insulated from system circuitry (i.e. a LCD is in a separate portion of the device than system circuitry). In these devices, the ambient temperature around a LCD lamp may be inaccurately determined as being a temperature proximate to the system circuitry. Accordingly, the present invention comprises embodiments that sense temperature of a LCD lamp at the LCD lamp.

An inverter may supply to a LCD lamp a voltage and current at levels in accordance with brightness adjustment information received from a microprocessor. In an exemplary system, voltage levels of 0 to 5 V may be used as brightness adjustment information for a LCD lamp. Brightness adjustment information corresponding to 0 V (1 mA) exhibits minimum brightness from a LCD. Brightness adjustment information corresponding to 5 V (6 mA) may correspond to a maximum brightness of a LCD. A plurality of levels may exist between a minimum brightness level and a maximum brightness level. A difference between adjacent levels may be in 0.5 V (0.5 mA) increments.

For example, a LCD lamp may have a lamp temperature characteristic exhibiting a temperature increase rate of 5 cd/m$^2$ per 1° C. while exhibiting a brightness of 150 cd/m$^2$ at an ambient temperature of 25° C. 5 V (6 mA) may be applied to a LCD lamp. For example, when the ambient temperature around a LCD lamp reaches 27° C., the brightness of the LCD lamp increases to 160 cd/m$^2$. When the ambient temperature around the LCD lamp further increases to 28° C., the brightness of the LCD lamp may increase to 165 cd/m$^2$. When ambient temperature around a LCD lamp reaches 29° C. brightness of the LCD lamp may increase to 170 cd/m$^2$. In embodiments of the present invention, voltage and current applied to a LCD lamp are reduced by amounts corresponding to a brightness increment of a LCD lamp caused by increase in ambient temperature. Accordingly, reduction of consumption of power may be accomplished while maintaining brightness of a LCD lamp.

FIG. 1 is an exemplary schematic view illustrating a configuration adapted to utilize heat internally generated from a system. Fan 120 may be installed in heat-generating part 110 (i.e. a CPU) to discharge heat generated from heat-generating part 110. Duct 130 may be arranged beneath cover 105. Heat collecting part 140 may be formed around LCD lamp 150. Duct 130 may have an inlet arranged near a discharge portion of fan 120. Duct 130 may have an outlet connected to heat collecting part 140. Fan 120 may be installed in a system to transfer heat generated from heat-generating part 110 to heat collecting part 140 connected to duct 130.

Ambient temperature around LCD lamp 150, which may be arranged inside heat collecting part 140, may be increased by heat transferred to heat collecting part 140. Increased ambient temperature around LCD lamp 150 may be sensed by a temperature sensor (not shown) arranged at a position proximate to heat collecting part 140. The temperature sensor may apply a sensing signal indicative of a sensed ambient temperature to a microprocessor included in a system.

An additional fan may be provided in order to prevent heat from flowing in reverse into a system via duct 130. An air discharge section may be provided at a portion of heat collecting part 140, thereby discharging hot air primarily transferred to heat collecting part 140 outwardly from a system.

Figure 2:
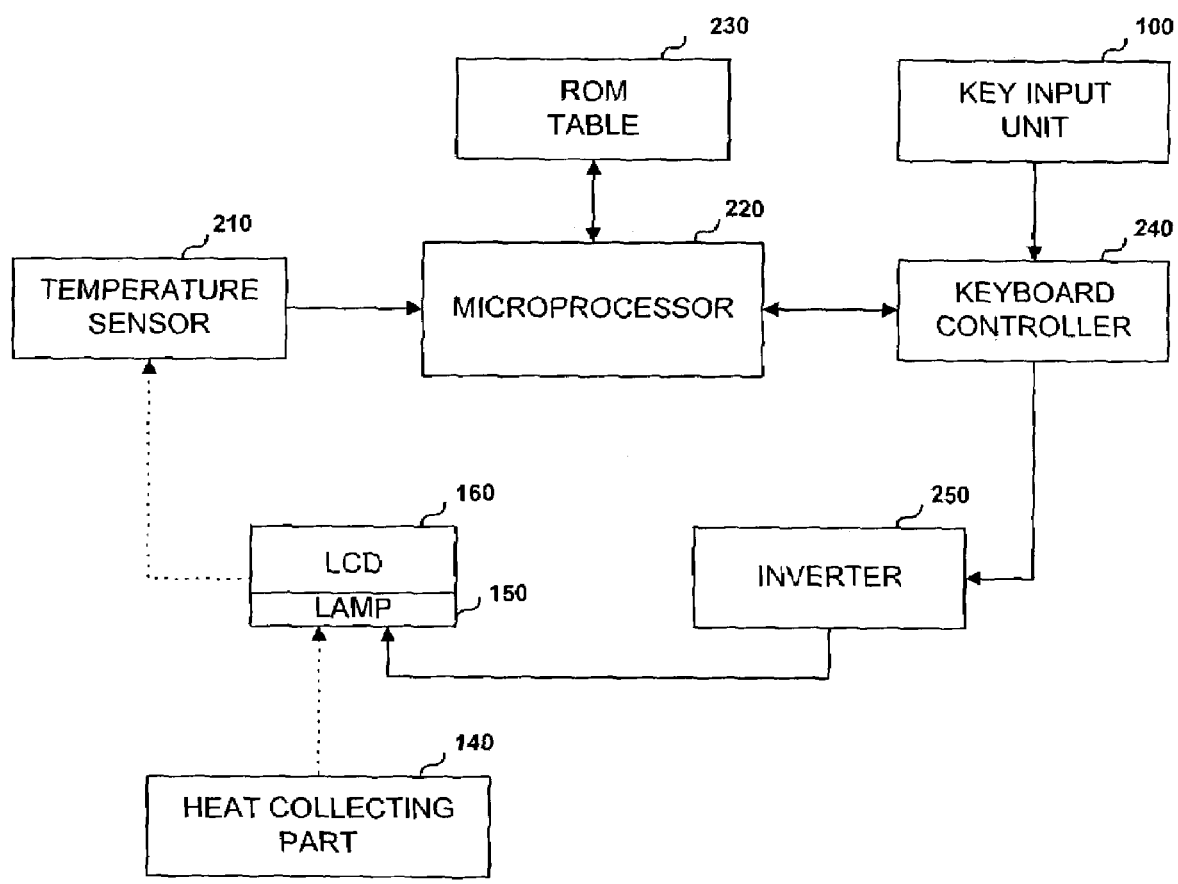
FIG. 2 is an exemplary block diagram illustrating a configuration of a LCD device power control apparatus which utilize heat internally generated from a system.

FIG. 2 is an exemplary block diagram illustrating a configuration of a LCD device power control apparatus according to embodiments of the present invention. A LCD device power control apparatus may include a temperature sensor 210, a microprocessor 220, a ROM table 230, a keyboard controller 240, and/or an inverter 250.

In ROM table 230, desired information (i.e. information about brightness of a LCD lamp associated with a plurality of brightness levels) may be stored as a table. In some embodiments, a plurality of tables, each corresponding to ROM table 230 may be stored in association with temperatures around LCD lamp 150.

Temperature sensor 210 may detect ambient temperature around LCD lamp 150. Temperature sensor 210 may send a detect signal indicative of a detected ambient temperature to microprocessor 220. Microprocessor 220 may read out, from ROM table 230, brightness information corresponding to a temperature detected by temperature sensor 210. Microprocessor 220 may send read-out brightness information to keyboard controller 240. Microprocessor 220 may receive, from keyboard controller 240, a brightness select signal inputted from key input unit 100 in accordance with a selection by a user. In response to a brightness select signal, microprocessor 220 may read out, from ROM table 230, brightness information corresponding to a brightness select signal and send read-out brightness information to keyboard controller 240. Keyboard controller 240 may generate a voltage and/or current control signal in accordance with brightness information from microprocessor 220. Keyboard controller 250 may send voltage and/or current control signals to inverter 250. In response to a voltage and/or current control signal, inverter 250 may apply a corresponding voltage and/or current to LCD lamp 150.

Temperature sensor 210 may measure ambient temperature around LCD lamp 150 in heat collecting part 140. Ambient temperature around LCD lamp 150 (i.e. an internal temperature of heat collecting part 140) may be increased as hot air formed in a system is introduced into heat collecting part 140 in accordance with an operation of a fan. Microprocessor 220 may apply to keyboard controller 240 brightness information which may be determined in accordance with a temperature detected by temperature sensor 210.

Microprocessor 220 may read out, from ROM table 230, brightness information that may be capable of allowing LCD lamp 150 to maintain a consistent brightness, based on temperatures detected by temperature sensor 210. Microprocessor 220 may output read-out brightness information to keyboard controller 240. Accordingly, it may be possible to control LCD lamp 150 to maintain a constant brightness. Accordingly, a lamp can have a prescribed relationship of brightness to temperature. Further, a lamp can have a prescribed relationship with driving current or voltage to brightness. Such exemplary relationships can be described by a function or a model. An exemplary function or model may be determined empirically.

Table 1 illustrates a control operation according to embodiments of the present invention.

TABLE 1

| | Ambient Temperature | | |
|---|---|---|---|
| Brightness Level | 25° C. | 29° C. | 35° C. |
| Level No. 1 (0 V, 1 mV) | 50 cd/m$^2$ | 70 cd/m$^2$ | 100 cd/m$^2$ |
| ... | ... | ... | ... |
| Level No. 6 (2.5 V, 3.5 mV) | 100 cd/m$^2$ | 120 cd/m$^2$ | 150 cd/m$^2$ |
| ... | ... | ... | ... |
| Level No. 9 (4 V, 5 mV) | 130 cd/m$^2$ | 150 cd/m$^2$ | 180 cd/m$^2$ |
| Level No. 10 (4.5 V. 5.5 mV) | 140 cd/m$^2$ | 160 cd/m$^2$ | 190 cd/m$^2$ |
| Level No. 11 (5 V, 6 mV) | 150 cd/m$^2$ | 170 cd/m$^2$ | 200 cd/m$^2$ |

For example, when brightness of LCD lamp 150 is set to correspond to exemplary level No. 11 at an ambient temperature around LCD lamp 150 of 25° C., LCD lamp 150 exhibits a brightness of 150 cd/M². When ambient temperature around LCD lamp 150 is 35° C., brightness of the LCD lamp 150 is 200 cd/M² unless the voltage (5 V) and/or current (6 mA) applied to LCD lamp 150 are appropriately varied. In other words, a system may exhibit a brightness unnecessarily increased by 50 cd/m². However, in accordance with embodiments of the present invention, this problem can be avoided. For instance, when ambient temperature around LCD lamp 150 is increased to 35° C., this temperature increase is detected by temperature sensor 210. Temperature sensor 210 may then apply a corresponding detect signal to microprocessor 220. In response to a detect signal, microprocessor 220 may read out from a table associated with an ambient temperature of 35° C., brightness information corresponding to a reference brightness of 150 cd/m². In other words, the brightness information of exemplary level No. 6 (corresponding to 2.5V and 3.5 mV) may be sent (as read-out brightness information) to keyboard controller 240. In accordance with brightness information of level No. 6, keyboard controller 240 may control inverter 250 to apply a voltage of 2.5 V and a current of 3.5 mA to LCD lamp 150. Accordingly, voltage and current applied to LCD lamp 150 may be reduced by 2.5 V and 2.5 mA.

It may be possible to reduce voltage and current applied to LCD lamp 150 while maintaining brightness of a LCD at the same level by passively or forcedly transferring heat to LCD lamp 150 by use of a thermal coupler (i.e. a fan, a duct, or a thermally conductive material). Accordingly, an increase in ambient temperature around LCD lamp 150 can increase efficiency of a LCD. Additionally, power consumption of a system can be reduced.

Figure 3:
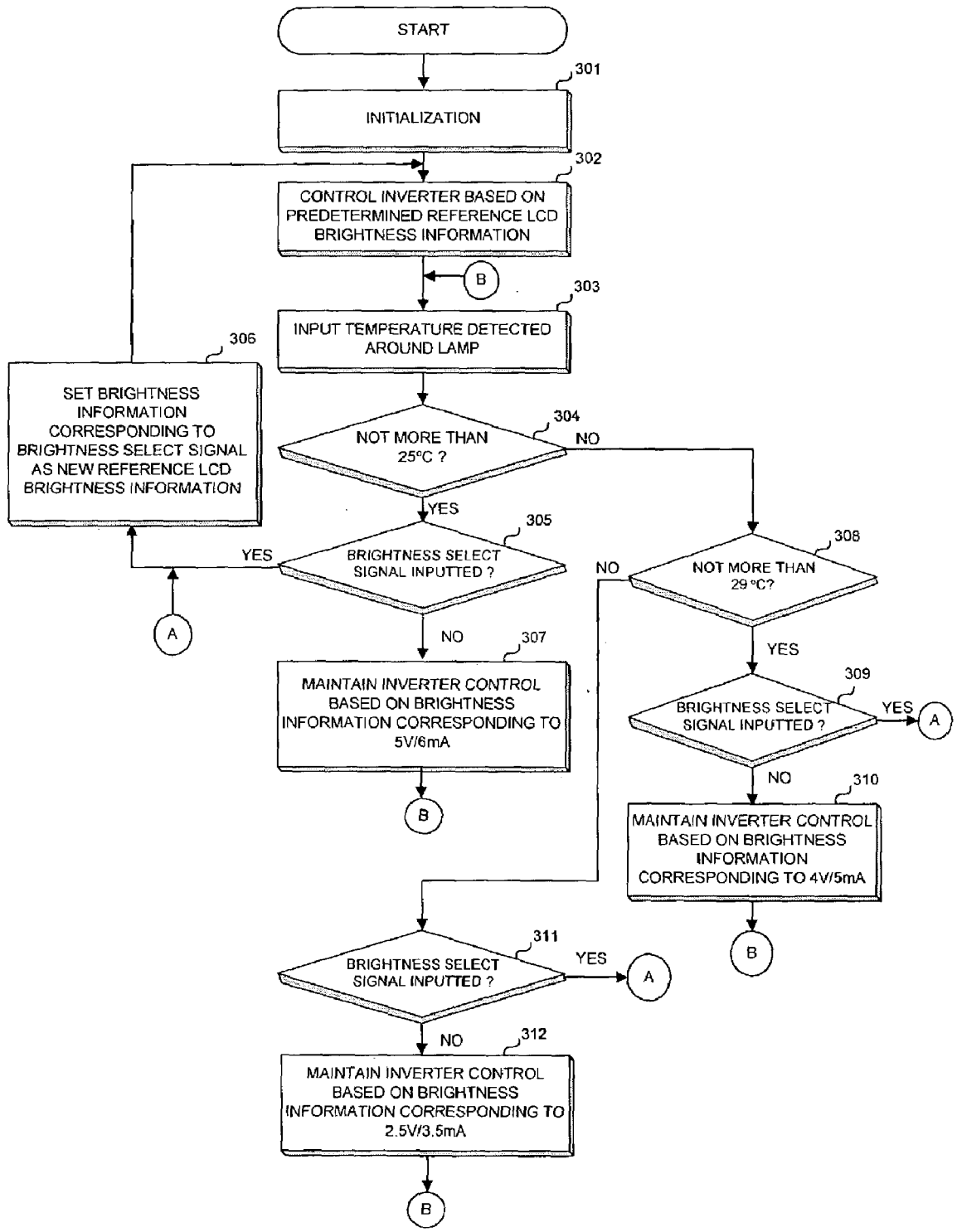
FIG. 3 is an exemplary flow chart illustrating a LCD device power control method.

FIG. 3 is an exemplary flow chart illustrating embodiments associated with a LCD device power control method. Microprocessor 220 may be first initialized in order to normally process power to a LCD (Step 301). Microprocessor 220 may then read out, from ROM table 230, brightness information corresponding to a predetermined ambient temperature (i.e. 25° C.) around LCD lamp 150. Microprocessor 220 may send read-out brightness information to keyboard controller 240. For example, brightness information may be brightness information of exemplary level No. 11 in Table 1. In accordance with a control operation of keyboard controller 240 (based on the brightness information) inverter 250 may apply to LCD lamp 150 a voltage (i.e. 5 V) and a current (i.e. 6 mA) (Step 302).

Fan 120 may feed air, heated by heat generated from operation of a system, to heat collecting part 140 arranged around LCD lamp 150 via duct 130. Accordingly, heat may be transferred to heat collecting part 140. As a result, an area around LCD lamp 150 may be continuously heated by heat transferred to heat collecting part 140

Ambient temperature around LCD lamp 150 may then be detected by temperature sensor 210 which may apply a detect signal indicative of a detected temperature to microprocessor 220 (Step 303). Based on a detect signal, microprocessor 220 may determine if ambient temperature around LCD lamp 150 is more than 25° C. (Step 304).

If it is determined at Step 304 that ambient temperature around LCD lamp 150 is not more than 25° C., microprocessor 220 may determine if there is a brightness select signal inputted by a key input unit (Step 305). When it is determined at Step 305 that there is an input brightness select signal, brightness information corresponding to a brightness select signal may be set as a new reference LCD brightness information (Step 306). The procedure may then return to Step 302. Accordingly, microprocessor 220 may read out, from ROM table 230, brightness information associated with new reference LCD brightness information. Microprocessor 220 may then send read-out brightness information to keyboard controller 240. In accordance with control operation of keyboard controller 240, inverter 250 may apply, to the LCD lamp 150, a voltage and/or current corresponding to newly-set brightness information. Subsequently, a procedure may proceed to Step 303 at which a detected signal indicative of ambient temperature around LCD lamp 150 may be applied to the microprocessor 220. These steps may be repeatedly executed.

If it is determined at Step 305 that there is no input brightness select signal, microprocessor 220 may maintain control operation adapted to apply, to LCD lamp 150, power corresponding to a detected temperature range of not more than 25° C. (i.e. a voltage of 5V and a current of 6 mA) in accordance with operation of inverter 250 (Step 307). Thereafter, the procedure may be returned to Step 303, at which a detected signal indicative of ambient temperature around LCD lamp 150 is applied to microprocessor 220. These steps may be repeatedly executed. When it is determined at Step 304 that ambient temperature around LCD lamp 150 is more than 25° C., microprocessor 220 may determine if ambient temperature around LCD lamp 150 is not more than 29° C. (Step 308).

If it is determined (at Step 308) that ambient temperature around LCD lamp 150 is not more than 29° C., microprocessor 220 may determine whether or not there is a brightness select signal input by a key input unit (Step 309). If it is determined at Step 309 that there is an input brightness select signal, brightness information corresponding to a brightness select signal is set as a new reference LCD brightness information (Step 306). The procedure may then return to Step 302. Microprocessor 220 may read out, from the ROM table 230, brightness information associated with new reference LCD brightness information. Microprocessor may send read-out brightness information to keyboard controller 240. In accordance with a control operation of keyboard controller 240, inverter 250 may apply to LCD lamp 150 a voltage and/or current corresponding to newly-set brightness information. Subsequently, the procedure may proceed to Step 303 at which a detected signal indicative of ambient temperature around LCD lamp 150 may be applied to microprocessor 220. These steps may be repeatedly executed.

If it is determined at Step 309 that there is no input brightness select signal, microprocessor 220 may read out, from the ROM table 230, brightness information corresponding to a detected temperature range of mote than 25° C., but not less than 29° C. Microprocessor 220 may send read-out brightness information to keyboard controller 240. Under control of keyboard controller 240, based on brightness information, inverter 250 may apply to LCD lamp 150 power corresponding to the brightness information (i.e. a voltage of 4V and a current of 5 mA) (Step 310). The procedure may then return to Step 303, at which a detected signal indicative of ambient temperature around LCD lamp 150 is applied to microprocessor 220. These steps may be repeatedly executed.

If it is determined at Step 308 that ambient temperature around LCD lamp 150 is more than 29° C., microprocessor 220 may determine if there is a brightness select signal input to key input unit (Step 311). When it is determined at Step 311 that there is an input brightness select signal, the procedure may be returned to Step 306 at which brightness information corresponding to a brightness select signal is set as new reference LCD brightness information. The procedure may then return to Step 302. Microprocessor 220 may then read out from ROM table 230 brightness information associated with new reference LCD brightness information. Microprocessor 220 may sends read-out brightness information to keyboard controller 240. In accordance with a control operation of keyboard controller 240, inverter 250 may apply to LCD lamp 150 a voltage and/or a current corresponding to newly-set brightness information. The procedure may proceed to Step 303, at which a detected signal indicative of ambient temperature around LCD lamp 150 is applied to microprocessor 220. These steps may be repeatedly executed.

If it is determined at Step 311 that there is no input brightness select signal, microprocessor 220 may read out from ROM table 230 brightness information corresponding to a detected temperature range of more than 29° C. Microprocessor 220 may then send read-out brightness information to keyboard controller 240. Under control of keyboard controller 240, based on brightness information, inverter 250 may apply to LCD lamp 150 power corresponding to the brightness information (i.e. a voltage of 2.5V and a current of 3.5 mA) (Step 312). The procedure may then return to Step 303 at which a detected signal indicative of ambient temperature around a LCD lamp 150 is applied to microprocessor 220. These steps may be repeatedly executed.

In some embodiments illustrated in FIG. 3, ambient temperature around a LCD lamp is divided into three temperature ranges. For example, a first range of not more than 25° C., a second range of more than 25° C. and less than 29° C., and a third range of more than 29° C. in order to appropriately vary voltage and current which may be applied to a LCD lamp. However, it may be desirable that ambient temperature around a LCD lamp is divided into more temperature ranges for better resolution of brightness control.

As apparent from the above description, embodiments of the present invention provides an apparatus and method for controlling power of a LCD, which can reduce power consumed by the LCD while maintaining brightness of the LCD. Embodiments of the present invention provide an apparatus and method for controlling power of a LCD device, in which power to be applied to a LCD lamp is varied in accordance with ambient temperature of the LCD lamp, so that it is possible to reduce the power consumed by the LCD lamp while maintaining the brightness of the LCD lamp corresponding to a designed reference value.

Embodiments of the present invention provide a LCD device power control apparatus in which heat generated from heat-generating internal system elements is transferred around a LCD lamp via a duct to increase the ambient temperature around the LCD lamp, so that it is possible to reduce the power consumed by the LCD lamp while maintaining the brightness of the LCD lamp corresponding to a designed reference value.

Embodiments provide an apparatus for controlling power of a liquid crystal display (LCD) device comprising: a LCD lamp; temperature sensing means for sensing an ambient temperature around the LCD lamp; and control means for performing a control operation for varying a voltage and/or current, to be applied to the LCD lamp, in proportion to the ambient temperature sensed by the temperature sensing means.

Embodiments provides an apparatus for controlling power of a liquid crystal display (LCD) device comprising: an element generating heat in accordance with a system operation thereof; heat transfer means for transferring the heat generated from the heat-generating element to a region around a LCD lamp; and control means for performing a control operation for supplying, to the LCD lamp, a brightness adjustment voltage and/or current proportional to an ambient temperature around the LCD lamp increased in accordance with the transferred heat by an inverter.

Embodiments provide a method for controlling power of a liquid crystal display (LCD) device comprising: (a) supplying a voltage and/or current to a LCD lamp, based on a predetermined temperature, and receiving information about a temperature measured around the LCD lamp; (b) identifying, from a table, supply power information associated with the LCD lamp while corresponding to the received temperature information; and (c) varying the voltage and/or current, to be supplied to the LCD lamp at the step (a), based on the identified supply power information, and supplying the varied voltage and/or current to the LCD lamp.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for controlling power of a liquid crystal display (LCD) device, comprising:
    circuitry that generates heat in accordance with a system operation thereof;
    a heat transfer device comprising a duct structure configured to transfer the heat generated by the circuitry from the circuitry to a region around an LCD lamp; and
    a controller configured to perform a control operation for supplying, to the LCD lamp, a brightness adjustment voltage and/or current in a predetermined relationship to an ambient temperature around the LCD lamp increased in accordance with the transferred heat, by an inverter.

2. The apparatus according to claim 1, further comprising:
    a fan configured to outwardly discharge the heat generated by the circuitry and feed the discharged heat to the heat transfer device via air.

3. The apparatus according to claim 2, wherein the heat transfer device comprises the duct structure that feeds the heat generated by the circuitry to a heat collecting region defined around the LCD lamp.

4. The apparatus according to claim 2, wherein the controller controls, in response to the input of a brightness adjustment signal by a user, the inverter to apply a voltage and/or current corresponding to the brightness adjustment signal to the LCD lamp.

5. The apparatus according to claim 1, wherein the LCD lamp comprises a cold cathode fluorescent lamp.

6. An apparatus for controlling power of a liquid crystal display (LCD) device, comprising:
    an LCD lamp;
    a temperature sensing device configured to sense an ambient temperature around the LCD lamp; and
    a controller configured to perform a control operation for varying a voltage and/or current, to be applied to the LCD lamp, in a prescribed relationship to the ambient temperature sensed by the temperature sensing device; and
    a heat transfer device comprising a duct structure configured to transfer heat from circuitry of the LCD device to the LCD lamp.

7. The apparatus according to claim 6, wherein the LCD lamp comprises a cold cathode fluorescent lamp.

8. The apparatus according to claim 6, further comprising:

a fan configured to outwardly discharge the heat generated by the circuitry and feed the discharged heat to the heat transfer device via air.

9. The apparatus according to claim 6, wherein the heat transfer device comprises the duct structure that feeds the heat generated by the circuitry to a heat collecting region defined around the LCD lamp.

10. The apparatus according to claim 6, wherein the controller controls, in response to the input of a brightness adjustment signal by a user, an inverter to apply a voltage and/or current corresponding to the brightness adjustment signal to the LCD lamp.

11. A method for controlling power of a liquid crystal display (LCD) device, comprising:

thermally coupling a LCD lamp to a circuitry of the LCD device via a duct structure such that heat generated by the circuitry is transferred to the LCD lamp;

supplying a voltage and/or current to the LCD lamp, based on a predetermined temperature, and receiving information about a temperature measured around the LCD lamp;

identifying, from a predetermined relationship, supply power information associated with the LCD lamp while corresponding to the received temperature information; and varying the voltage and/or current to be supplied to the LCD lamp based on the identified supply power information, and supplying a varied voltage and/or current to the LCD lamp.

12. The method according to claim 11, further comprising:

applying, in response to the input of a brightness adjustment signal by a user, a voltage and/or current corresponding to the brightness adjustment signal to the LCD lamp.

13. The method according to claim 11, wherein the LCD lamp comprises a cold cathode fluorescent lamp.

* * * * *